United States Patent [19]

Seefluth

[11] 3,959,426

[45] May 25, 1976

[54] METHOD OF TRANSFERRING AND ALIGNING PARISONS USING CLAMPING JAWS WITH OFFSET TINES

[75] Inventor: Charles L. Seefluth, Bartlesville, Okla.

[73] Assignee: Phillips Petroleum Company, Bartlesville, Okla.

[22] Filed: Dec. 4, 1974

[21] Appl. No.: 529,552

Related U.S. Application Data

[62] Division of Ser. No. 375,126, June 29, 1973, Pat. No. 3,870,446.

[52] U.S. Cl. .............................. 264/94; 264/322; 264/323
[51] Int. Cl.² ........................................ B29C 17/07
[58] Field of Search ............... 264/89, 90, 92, 94, 264/96, 98, 99, 322, 323; 425/326 B, 387 B, DIG. 213, 216

[56] References Cited
UNITED STATES PATENTS

| | | | |
|---|---|---|---|
| 2,958,556 | 11/1960 | Samuelson et al. | 294/86 |
| 3,292,798 | 12/1966 | Harper et al. | 214/1 |
| 3,329,460 | 7/1967 | Sprague | 294/88 |
| 3,619,857 | 11/1971 | Gilbert | 425/387 |
| 3,801,690 | 4/1974 | Gilbert | 264/99 |
| 3,864,445 | 2/1975 | Dean | 425/DIG. 213 |

*Primary Examiner*—Jan H. Silbaugh

[57] ABSTRACT

A method employing a parison transfer device which comprises a pair of opposed clamping jaws with offset tines disposed so as to extrude polymer laterally between said tines to form a flange at right angles to the axis of the parison so that on transfer the parison can be held securely so as to avoid wobbling.

4 Claims, 6 Drawing Figures

METHOD OF TRANSFERRING AND ALIGNING PARISONS USING CLAMPING JAWS WITH OFFSET TINES

CROSS REFERENCE TO RELATED APPLICATION

This application is a divisional of copending application Ser. No. 375,126 filed June 29, 1973 now U.S. Pat. No. 3,870,446.

BACKGROUND OF THE INVENTION

This invention relates to a method for transferring parison preforms to a molding station.

Blow molding hollow articles such as bottles and the like from reheated parison preforms so as to take advantage of the strengthening effect of molecular orientation is known in the art. Exemplary of such art is Wiley et al., U.S. Pat. No. 3,507,005. Inherent in such a molding technique is the necessity for transferring parisons from a heating means to a molding station. In laboratory or development scale equipment this can easily be accomplished by hand or by simple mechanical means. However, for such a technique to be successful on a commercial scale, it is necessary to transfer the parison quickly and precisely to the molding station. This brings about the dual requirement of the transfer device aligning the parison properly in the event it is out of alignment in the heating means employed and in any event holding the parison securely as it is transferred so that it will not wobble, thus allowing it to be placed precisely into alignment with a neck forming means.

BRIEF SUMMARY OF THE INVENTION

It is an object of this invention to make possible the production of bottles and the like from reheated parisons at high production rates; it is yet a further object of this invention to reduce rejects and imperfectly formed bottles due to poor positioning of the parison in the molding station; and it is still yet a further object of this invention to grasp a parison in such a way that lateral movement of the free end relative to the clamped end is precluded.

In accordance with this invention, a pair of opposed clamping jaws have offset tines which result in a portion of the parison being extruded laterally to form a flange against which the clamping jaws can press to hold the parison securely.

BRIEF DESCRIPTION OF THE DRAWINGS

In the drawings, forming a part hereof, wherein like reference characters denote like parts in the various views.

DESCRIPTION OF THE PREFERRED EMBODIMENTS

Figure 1:
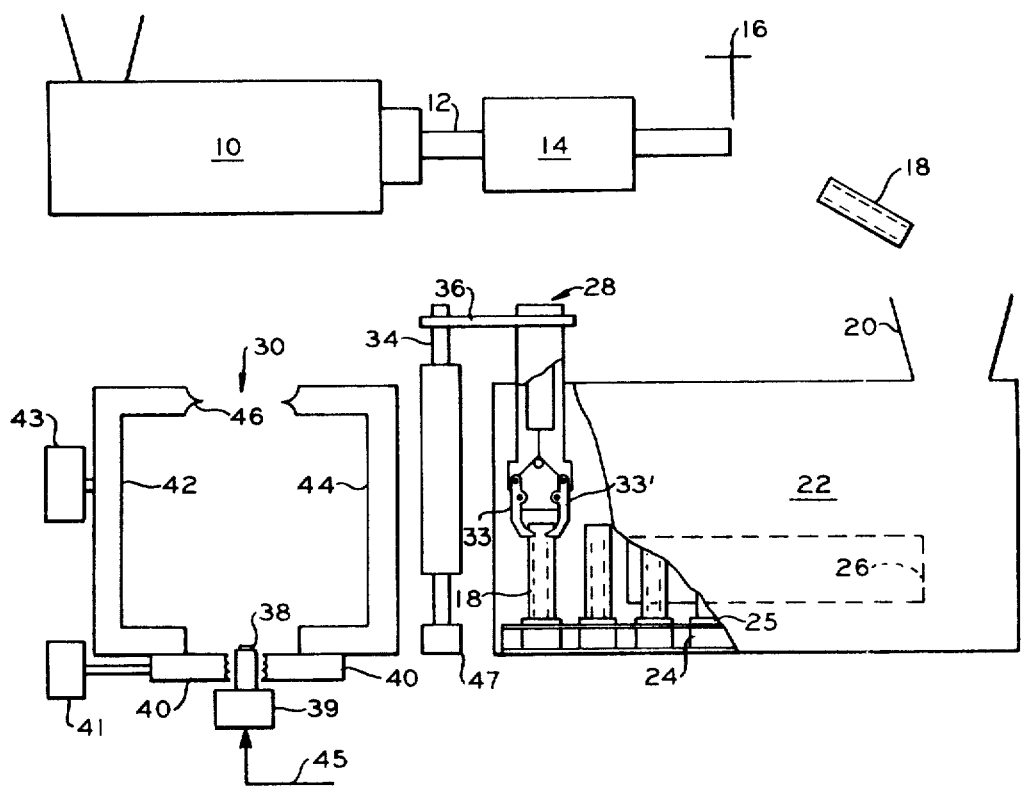
FIG. 1 is a side elevation with parts cut away of a blow molding apparatus having a parison transfer mechanism utilizing the clamping jaws of this invention.

The apparatus of this invention can be utilized in the blow molding of any type of hollow article from a tubular parison preform. Primarily it is of utility in the forming of biaxially oriented hollow articles such as bottles from parison preforms which have been reheated to orientation temperature. By orientation temperature is meant the temperature at which a polymer on stretching exhibits an increase in strength. For crystalline polymers this is generally in the range of 1 to 50, preferably 10° to 30°F below the crystalline melting point. For amorphous polymers the temperature is generally within the range of 40 to 225, preferably 100° to 175°F below the homogeneous melt point. Exemplary crystalline polymers are the normally solid polymers and copolymers of at least one mono-1-olefin having 2–8 carbon atoms per molecule, preferably polypropylene. Exemplary amorphous polymers are polyvinyl chloride, polystyrene, vaious styrenes/butadiene-containing resins and the like.

While the clamping jaws of the invention can be used for transferring parisons from any heating means into a molding station, the preferred heating means is an air oven. Also suitable are radiant heating chambers or a combination of an air oven having supplemental radiant heat. In the preferred embodiment the parisons are delivered in a vertical position to a picker station after being conveyed through an oven on upstanding pins.

The projecting tines on the clamping jaws must be offset since the lower surface of the upper tine is above the upper surface of the lower opposing tine an amount generally within the range of 10 to 50% of a single wall thickness of the parison being transferred. For parisons of the size convenient for producing most bottles presently used in commerce a spacing between the surfaces of one-sixteenth to one-fourth inch will be satisfactory although this can vary since the only requirement is that the spacing be wide enough that material can be extruded out laterally so as to provide a flange which can be held securely to prevent lateral movement of the other end of the parison relative to the gripped end.

It is particularly advantageous in the operation of the apparatus described herein for the parison to be preblown slightly prior to closing the mold on it to effect sealing. Since the open upper end of the parison is already closed off as a result of being gripped between the opposing jaw means of the invention, air or other blow fluid can be introduced through the thread forming plug to effect preblow. In the preferred embodiments where the parison is at orientation temperature, the preblow fluid must be introduced under a greater pressure than 3 to 6 psi normally used for preblowing in conventional blow molding operations in which hot extruded parisons are used. Preblow pressure of at least 25 psig is preferred with a range of 25 to 50 psig being entirely satisfactory. However, it has been found that by controlling the rate of introduction or the timing of the preblow introduction, the same source of fluid can be used in the preblow which is utilized in the main blow. For instance, fluid under the full pressure (80 to 150 psig, for instance) can be admitted to preblow the parison just as the mold halves begin to close; without ever interrupting the flow, the parison will be preblown just as the mold halves close and thereafter the fluid pressure expands the parison into conformity with the mold. The parison will undergo slight radial expansion as a result of the introduction of the preblow fluid.

It is preferred when operating with parisons at orientation temperature that the mold halves have leading edges contoured so as to have a severing edge which is the furthermost extension thereof; this severing edge cooperates with the matching edge on the opposing mold half to sever the parison. Adjacent a bottom wall forming portion of the sealing and severing section of the mold halves is a second projection which cooperates with a matching projection on the opposing mold half to hold said thus severed parison within a bead forming cavity. Between the holding projection and the severing edge of each sealing and severing means is a small cavity which in cooperation with the matching cavity on the other mold half forms a bead forming mold.

Referring now to the drawings, particularly FIG. 1, there is shown a schematic representation of a blow molding operation utilizing the clamping jaws of this invention. Extruder 10 forms a tubular extrudate 12 which passes to cooling and sizing zone 14 and thence to cutting means 16 where it is cut into individual open end tubular parison preforms 18 which fall into loading hopper 20 of oven 22. Oven 22 is a circulating air oven having a continuous chain 24 with spaced parison support means 25 for conveying parison 18 therethrough in an upright manner. Radiant heaters 26 provide supplemental heat to aid in more quickly and uniformly heating the parisons to orientation temperature.

Parison transfer mechanism designated generally by the reference character 28 transfers the parisons from oven 22 to the molding station generally designated by reference character 30. The construction of transfer mechanism 28 will be described in greater detail in reference to FIGS. 2 to 6. At the point in the cycle depicted in FIG. 1, gripping jaws 33 and 33'have grasped the upper open end of a parison. Ball bearing spline shaft 34, attached to arm 36 which carries the clamping jaws, is raised axially upward so as to lift parison 18 upward out of the oven. Thereafter shaft 34 rotates about its axis moving parison 18 in an arc and stopping with parison 18 positioned directly above thread-forming plug 38. Shaft 34 then descends positioning the bottom open end of parison 18 over plug 38. As is evident, it is necessary for jaws 33 and 33' to hold parison 18 rigidly so that there is no lateral sway of the bottom end of the parison relative to the gripped upper end; otherwise, the parison would not be placed properly over the thread-forming plug 38. Thread-forming jaws 40 then close and optionally plug 38 is advanced axially upward an additional distance into the open end of said parison to thus form the threads and/or neck area. Ball spline shaft 34 then moves axially upward again thus stretching the parison between thread-forming dies 40 and clamping jaws 33 and 33'. This stretching operation terminates just as the clamping jaws clear above the top of mold halves 42 and 44. Mold halves 42 and 44 then converge with the blade 46 of the mold halves severing and sealing the parison. Fluid pressure is then introduced via line 45 to expand said parison into conformity with the mold cavity to form a biaxially oriented bottle. During this time shaft 34 is rotated to position clamping jaws 33 and 33'over a scrap receiving means whereupon the clamping jaws open to deposit the severed end of parison 18. Rotation of shaft 34 continues until clamping jaws 33 and 33' in open position are again placed over a parison in oven 22 whereupon shaft 34 descends and said jaws close on the parison. The mold halves then open and the thus-formed bottle is then removed. By this time transfer mechanism 28 has the next parison ready for positioning over plug 38. Plug 38 is moved axially upward and downward by means of cylinder 39. Die means 40 are moved into and out of engagement by means of cylinder 41 and mold halves 42 and 44 are opened and closed by means of cylinder 43 operating on mold half 42 and on identical cylinder (not shown) acting on mold half 44. Air is introduced into the interior of the parison to effect expansion of same via line 45 which feeds into a hollow core of plug 38. Rotating pneumatic cylinder 47 serves as means to rotate shaft 34 and move same axially.

Figure 2:
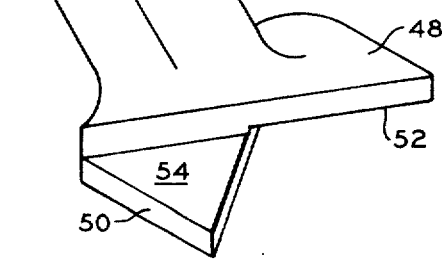
FIG. 2 is a perspective view of one of the opposed jaw members.
Figure 3:
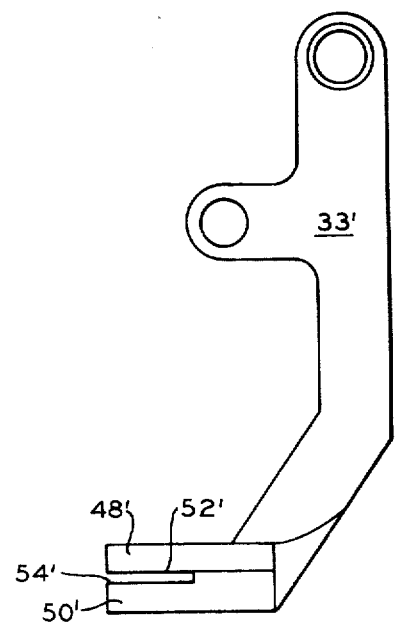
FIG. 3 is a side view of one of the opposed jaw members.

Referring now to FIG. 2 there is shown in detail clamping jaw 33 having a pair of forwardly and outwardly projecting tines in a general v-configuration. First tine 48 has a lower face 52 which is disposed above face 54 of second tine 50. In this regard and in other areas in the description wherein "upper" and "lower" are used it is meant simply to refer to the relative arrangement of the parts as shown in the drawings. The clamping jaws of the invention could be utilized to extract a parison in a horizontal position from a heating means or the molding station could be inverted wherein the parison transfer mechanism 28 would rotate the parison through 180°to point the open end upward and over a downwardly projecting plug so as to blow the bottle in a right side up position. Member 56 serves as the means to open and close the jaw members and can be activated by a cam or air cylinder as shown. FIG. 3 shows opposing jaw member 33' which is a mirror image of jaw member 33. As can be seen from this side view, tine 48' is offset above tine 50' with the space between the upper face 54' of tine 50' and the lower face 52' of tine 48' being within the range of about one-sixteenth to one-fourth of an inch. Similarly the upper face 54 of tine 50 and the lower face 52 of tine 48 are separated by one-sixteenth to one-fourth inch.

Figure 5:
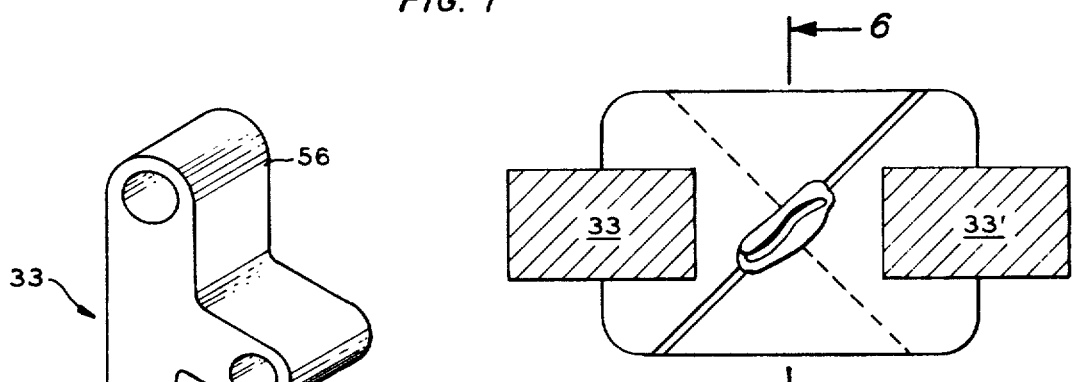
FIG. 5 is a top elevation of the jaws of FIG. 4 at a later stage in the operation.
Figure 6:
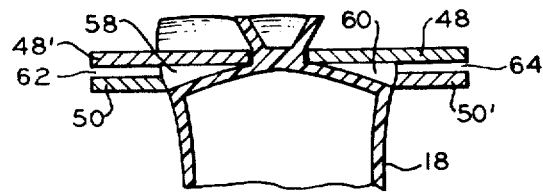
FIG. 6 is a sectional view along section lines 6–6 of FIG. 5.
Figure 4:
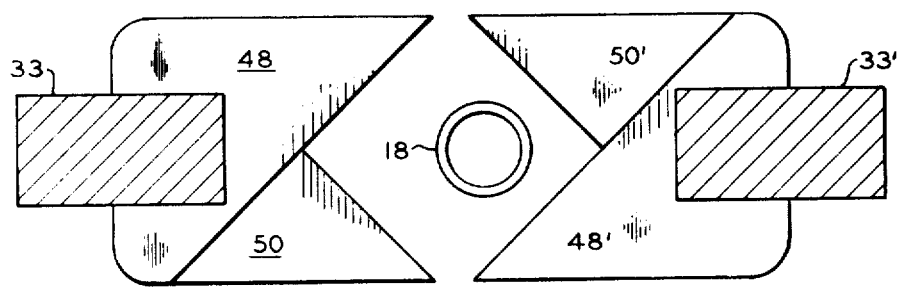
FIG. 4 is a top elevation of the opposed jaw members closing on a parison.

FIGS. 4 and 5 depict opposed jaws 33 and 33' closing on parison 18. Initially as can be seen from FIG. 4, parison 18 is not exactly centered. However the action of tines 50' and 48' which first contact the parison tend to straighten same so as to cause it to be disposed exactly concentric with the axis of the clamping jaws in their closed position. FIG. 5 shows these jaws in the closed position having closed off and gripped the end of the parison. FIG. 6 is a sectional view showing the extrusion of flanges 58 and 60 between the opposed tines. Flanges 58 and 60 quickly cool to a solid condition since the parison is already at orientation temperature which is below the crystalline melting point thus the flanges immediately provide a rigid support against which the clamping jaws can press to give leverage so that a parison can be held rigid with the lower end thus being precluded from wobbling or traveling laterally relative to the clamped end during transfer. As noted hereinabove the spaces 62 and 64 between the opposed tines generally will be within the range of 10 to 50 per cent of the single wall thickness of a parison.

Many conventional parts such as temperature controllers, frame elements, and the like have been omitted for the sake of simplicity but their inclusion is understood by those skilled in the art.

EXAMPLE

Propylene homopolymer having a density of 0.905 (ASTM D 1505-63T), a melt flow of 2 (ASTM D 1238-62T, condition L), and a crystalline melting point of about 340°F was extruded into tubing having an outside diameter of about 0.9-inch and a wall thickness of 0.150-inch. The tubing was cooled to room temperature in a vacuum sizing and quenching chamber and was cut into 7-inch lengths. These 7-inch lengths were placed on vertically disposed pins carried by a continuous chain within a circulating air oven and passed through said oven. Supplementary heat was imparted by radiant panel heaters. The lengths were heated to a temperature of 320°F and advanced into position below a transfer mechanism. The transfer mechanism was identical to that shown in the drawings utilizing clamping jaws having tines with a thickness of three-sixteenths of an inch and a spacing between the lower face of the first tine and the upper face of the second tine of one-sixteenth of an inch. The leading edge of each tine was at an angle of about 53° from a vertical plane through the center of the jaws parallel with the direction of movement of said clamping jaws with the tip of the two tines of each jaw being 1.50 inches apart. The angle can vary somewhat from the 53° shown, with it generally being within the range of 30°–70° preferably 45°–60°. They were constructed of tool steel. Opposing jaws were moved together gripping and closing off the upper end of a parison and extruding a portion thereof laterally to form flanges between opposed tines. The thus gripped parison was lifted axially out of the oven and transferred through an arc into position directly over a thread-forming plug identical to that shown in the drawings. The jaws were then lowered to place the end of the parison over said plug. Thread-forming dies then closed on the parison, the plug was moved axially upward a short distance, the gripping means was raised to stretch the parison so that the portion between the thread-forming dies and the clamping jaws was stretched to approximately twice its original length. Thereafter preblow air at a pressure of 50 psig was introduced into the interior of the parison to give a slight radial expansion to the parison. Thereafter mold halves were closed on said parison, the upper portion of said mold halves having a configuration including a sealing cavity which produced a tab at the seal area, said upper portion of said mold halves also having a blade means to pinch the parison off adjacent said tab. Thereafter, blow air was introduced to expand the parison out into complete conformity with the mold cavity. The parison transfer arm was rotated to a position over a scrap receiving means and the clamping jaws opened to release the severed upper end of the parison. The mold cavity was then opened and the bottle ejected by blowing additional air through the plug. Total cycle time per bottle per mold was only about 6 seconds with the parisons being placed precisely over said pin due to the fact that the flange produced when the clamping jaws closed allowed good leverage for preventing lateral movement at the lower end of the parison relative to the upper end as the parison was quickly moved laterally into position over the pin. Also the mold halves closed so as to form a seal in the center of the resulting article as a result of the tines automatically aligning the parison vertically when closing on same to effect the initial clamping of the parison.

While this invention has been described in detail for the purpose of illustration, it is not to be construed as limited thereby but is intended to cover all changes and modifications within the spirit and scope thereof.

What is claimed is:

1. A method of providing a thermoplastic parison at orientation temperature for blow molding comprising: heating said thermoplastic parison to orientation temperature; applying pressure inward to opposed sides of said parison from areas spaced apart axially a slight distance to thus close off said parison and extrude a plurality of flat flanges at right angles to a longitudinal axis of said parison; cooling said thus extruded flanges to a solid condition to provide a rigid support; and holding said parison by said flanges as said parison is transferred axially and laterally.

2. A method according to claim 1 wherein said parison is heated by passing same in an upright position through an air oven.

3. A method according to claim 2 wherein said parison is lowered into position into a thread-forming zone and held thereby as said parison is stretched longitudinally by applying axial force to the opposite end thereof, and thereafter said thus stretched parison is sealed and severed at an end opposite said end held in said thread-forming zone and internal fluid pressure is introduced to expand same out into conformity with the molding zone.

4. A method according to claim 1 wherein said flanges have a thickness of 10 to 50 per cent of the single wall thickness of said parison.

* * * * *